United States Patent
Sallas et al.

(10) Patent No.: US 10,557,951 B2
(45) Date of Patent: Feb. 11, 2020

(54) BOREHOLE SEISMIC SOURCE AND METHOD

(71) Applicant: CGG SERVICES SA, Massy (FR)

(72) Inventors: John James Sallas, Plano, TX (US); Peter Maxwell, Missouri City, TX (US); Ludovic Leblanc, Massy (FR)

(73) Assignee: CGG SERVICES SAS, Massy (FR)

( * ) Notice: Subject to any disclaimer, the term of this patent is extended or adjusted under 35 U.S.C. 154(b) by 810 days.

(21) Appl. No.: 14/969,066

(22) Filed: Dec. 15, 2015

(65) Prior Publication Data
US 2016/0282488 A1    Sep. 29, 2016

Related U.S. Application Data (60) Provisional application No. 62/137,287, filed on Mar. 24, 2015.

(51) Int. Cl.
| | |
|---|---|
| *G01V 1/133* | (2006.01) |
| *G01V 1/00* | (2006.01) |
| *G01V 1/52* | (2006.01) |
| *G01V 1/135* | (2006.01) |

(52) U.S. Cl.
CPC .............. *G01V 1/133* (2013.01); *G01V 1/003* (2013.01); *G01V 1/135* (2013.01); *G01V 1/52* (2013.01)

(58) Field of Classification Search
CPC ........ G01V 1/133; G01V 1/003; G01V 1/135; G01V 1/52; G01V 1/155
See application file for complete search history.

(56) References Cited

U.S. PATENT DOCUMENTS

| | | | | |
|---|---|---|---|---|
| 3,578,081 A | * | 5/1971 | Bodine | E21B 43/003 166/249 |
| 4,432,078 A | * | 2/1984 | Silverman | G01V 1/133 166/249 |
| 4,722,417 A | * | 2/1988 | Selsam | G01V 1/133 181/106 |
| 4,874,061 A | * | 10/1989 | Cole | G01V 1/153 181/106 |
| 5,109,946 A | * | 5/1992 | Sorrells | G01V 11/005 181/104 |
| 5,113,966 A | | 5/1992 | Gregory et al. | |
| 5,115,880 A | * | 5/1992 | Sallas | G01V 1/02 181/106 |

(Continued)

FOREIGN PATENT DOCUMENTS

| | | |
|---|---|---|
| EP | 0 780 701 A1 | 6/1997 |
| EP | 2 610 644 A2 | 7/2013 |

OTHER PUBLICATIONS

Extended European Search Report in corresponding European Application No. EP 15 30 7096 dated Aug. 4, 2016.

*Primary Examiner* — Hovhannes Baghdasaryan
*Assistant Examiner* — Amie M Ndure
(74) *Attorney, Agent, or Firm* — Patent Portfolio Builders PLLC (57) ABSTRACT

Method and seismic source for generating seismic waves in a borehole. The seismic source includes a housing; an actuator mechanism located inside the housing and configured to generate a fluctuating pressure; a flexible membrane attached to the housing and configured to hold a fluid; and a coupling device covered by the flexible membrane and configured to generate a static pressure on the flexible membrane.

14 Claims, 9 Drawing Sheets

(56) References Cited

U.S. PATENT DOCUMENTS

| | | | | |
|---|---|---|---|---|
| 5,189,263 A * | 2/1993 | Bearden | ............... | G01V 1/09 |
| | | | | 181/113 |
| 5,229,977 A * | 7/1993 | Owen | ............... | G01V 1/13 |
| | | | | 181/117 |
| 6,012,521 A * | 1/2000 | Zunkel | ............... | B09C 1/00 |
| | | | | 166/177.1 |
| 6,405,797 B2 * | 6/2002 | Davidson | ............... | B01J 8/02 |
| | | | | 166/177.6 |
| 6,909,666 B2 * | 6/2005 | Dubinsky | ............... | G01V 1/44 |
| | | | | 367/81 |
| 2004/0094354 A1 * | 5/2004 | West | ............... | G01V 1/52 |
| | | | | 181/105 |
| 2004/0223410 A1 * | 11/2004 | West | ............... | G01V 1/16 |
| | | | | 367/25 |
| 2012/0243377 A1 * | 9/2012 | Morozov | ............... | G01V 1/135 |
| | | | | 367/143 |
| 2016/0282488 A1 * | 9/2016 | Sallas | ............... | G01V 1/133 |

* cited by examiner

BOREHOLE SEISMIC SOURCE AND METHOD

CROSS REFERENCE TO RELATED APPLICATIONS

This application claims priority and benefit from U.S. Provisional Patent Application No. 62/137,287, filed Mar. 24, 2015, the entire contents of which are incorporated in their entirety herein by reference.

BACKGROUND

Technical Field

Embodiments of the subject matter disclosed herein generally relate to generating seismic waves in a non-vertical borehole, and more specifically, to deploying a seismic source that can travel through a non-vertical borehole and achieve a good coupling with the surrounding medium when shooting.

Discussion of the Background

In geophysical prospecting, gas and oil reservoirs are sought by performing seismic surveys of sedimentary rock formations using variations of seismic wave propagation velocity from one layer to another. Reflected, refracted and transmitted waves are detected by seismic receivers after traveling through an explored formation.

Hydrocarbon reservoir surveillance during production is a tool employed to reduce operating costs and maximize recovery of oil and/or gas. Time-lapse (4D) seismic methods use seismic surveys performed during distinct survey periods to monitor changes in the reservoir during production. Seismic velocity and density of a formation, including a producing reservoir, depend on rock type and fluid properties. Changes in seismic responses between surveys may be caused by changes in reservoir saturation, pore fluid pressure during fluid injection or depletion, fractures, temperature changes, etc.

In time-lapse seismic or 4-D seismic, seismic surveys are repeated typically using the same survey acquisition parameters. The time lapsed between consecutive surveys may range from about several months up to a year. After the recorded seismic data sets have been processed to form an image of the surveyed underground, difference plots are produced to highlight where change has occurred within the reservoir. This information is useful for adjusting pumping and/injection schedules, to help manage the development of a hydrocarbon reservoir.

One problem with time-lapse seismic surveys is that soil moisture content, temperature and other factors vary over time. This means that a coupling between a surface source and the seismic receivers can change significantly between surveys. A solution that avoids the pitfalls of the above noted survey is permanent reservoir monitoring, where sources and receivers are permanently installed underground in consolidated material and cemented into rock formations. However, this method is expensive and the buried equipment cannot be reused.

An economic alternative to permanent reservoir monitoring with good repeatability is needed. A method that can be used in sensitive areas where disturbance of the topsoil may be an issue is valuable as well. Accordingly, it is desirable to develop methods and sources that avoid the above-identified drawbacks of conventional methods.

SUMMARY

According to an embodiment, a seismic source for generating seismic waves in a borehole includes a housing; an actuator mechanism located inside the housing and configured to generate a fluctuating pressure; a flexible membrane attached to the housing and configured to hold a fluid; and a coupling device covered by the flexible membrane and configured to generate a static pressure on the flexible membrane.

According to another embodiment, there is a system for seismic survey in a borehole. The system includes a seismic source that generates seismic waves; an umbilical connected between a first end of the seismic source and a first support equipment; and a strength member connected between a second end of the seismic source and a second support equipment. The first and second support equipment are configured to move the seismic source within a casing and to instruct the seismic source when to shoot.

According to still another embodiment, there is a method for generating seismic waves in a borehole. The method includes driving a seismic source in a non-vertical borehole to a desired first location, shooting the seismic source, moving the seismic source with one umbilical and one strength member, attached to opposite ends of the seismic source and to two different surface locations, to a second location, and shooting again the seismic source.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a horizontal borehole. However, similar embodiments and methods may be used for a vertical borehole or a borehole that has non-horizontal portions or the entire borehole is neither horizontal nor vertical.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, one or more seismic sources are placed in borehole that has at least a non-vertical portion. The borehole in this embodiment has two ends, both of which communicate with the surface. In one embodiment, the borehole has only one end that communicates with the surface. In one embodiment, the borehole is horizontal. In another embodiment, the borehole is fully dedicated to housing seismic sources and/or receivers. In other words, in this embodiment, no drill line or exploration line is present or allowed in the borehole. In still another embodiment, plural boreholes dedicated to seismic data collection are present. While some boreholes hold sources, other boreholes hold receivers. In one embodiment, the sources and receivers may be mixed in the same borehole. The boreholes may run parallel to each other, perpendicular to each other or in any desired pattern. The boreholes may be located at the same depths relative to the surface or at different depths. While horizontal boreholes are shown in the figures for simplicity, the boreholes may have any shape. Such a seismic system is now discussed with reference to FIG. 1.

Figure 1:
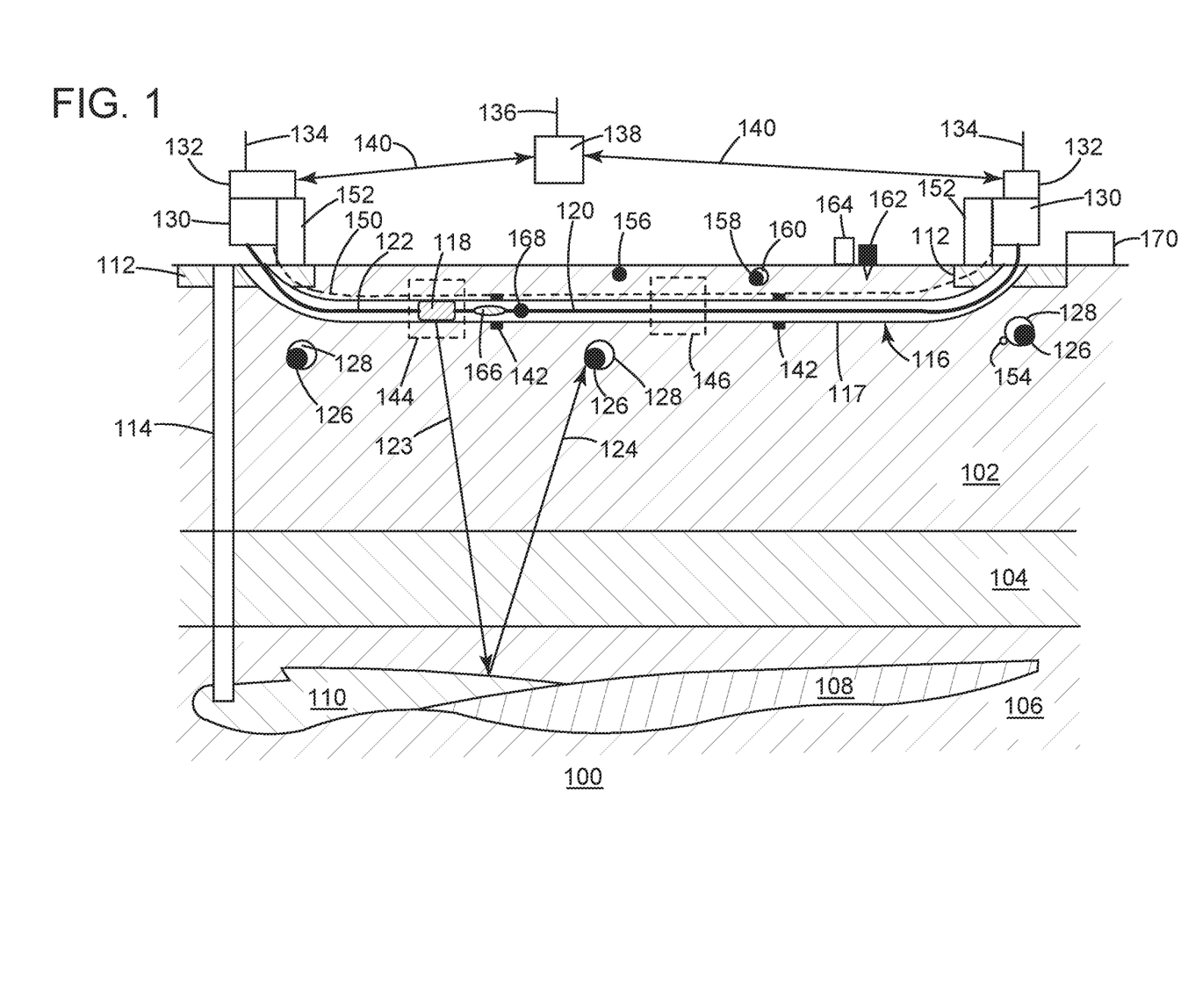
FIG. 1 illustrates a borehole based seismic system for acquiring seismic data.

FIG. 1 shows a vertical cross section of a producing oilfield 100. Multiple pads or platforms 112 are located throughout the oilfield 100. A pad 112 may have a producing well or fluid injection well 114 located upon it or other equipment, for example, compressors, valves, and other equipment typical for a well. Fluid injection well 114 may be in fluid communication with subterranean region 110 that contains the injection fluid for secondary oil recovery. Subterranean region 110 may be in fluid contact with hydrocarbon bearing subterranean region 108. Both regions 108 and 110 lay within geologic formation 106, which is located beneath stratum 104 and a near surface layer 102. Near surface layer 102 is typically comprised of unconsolidated material such as clay, sand or soil.

In one embodiment, at least one non-vertical (e.g., horizontal or having horizontal portions) borehole 116 is connected between two pad sites 112. This means that both ends of the borehole 116 communicate with the earth's surface. While borehole 116 is shown horizontal, it may contain sections that are sloped, vertical, curved. Other geometries are possible. Borehole 116 may have a casing 117 or not. Borehole 116 houses at least one borehole source 118, which is connected to one or more umbilical cables. FIG. 1 shows one umbilical 120 and one strength member 122. Umbilical 120 may contain strain members (e.g., ropes made of steel, Kevlar, polyester or other materials or a chain), electrical, hydraulic and/or pneumatic transmission elements such as wires, fiber optic cable and hoses used for positioning, power, source control and communication as discussed later. In one embodiment, it is possible that strength member 122 is substituted by an umbilical. Note that in the following, an umbilical is understood to be a structure that provides at least one of data transmission, power transmission, hydraulic or pneumatic transmission while a strength member is understood to not provide such capabilities. The ends of umbilical 120 and strength member 122 are connected to corresponding support equipment 130 that may be located on pads 112 or nearby. Support equipment 130 may include power packs, engines, winches, hoists, take-up reels, amplifiers, sweep generators and other devices necessary to position, power and control the operation of source 118 within borehole 116.

Support equipment 130 may be under the command of acquisition management controller 138, which is connected through a bi-directional link 140 (wired or wireless) to source transceiver 132. Source transceiver 132 transmits commands and source performance information between support equipment 130 and acquisition management controller 138. Source transceiver 132 and/or support equipment 130 may be equipped with GPS receivers and/or radio telemetry equipment 134.

In one embodiment, other boreholes 128 for housing sources and/or receives may be present. FIG. 1 shows boreholes 128 running about perpendicular and below borehole 116. In this embodiment, boreholes 128 host seismic receivers 126. Seismic receivers 126 may include discrete sensors like hydrophones, if the borehole casing was filled with water, or they could be housed within a streamer. In another embodiment, seismic receivers 126 can be DAS (distributed acoustic sensing) devices that might contain fiber optic devices configured to be sensitive to strain and might include devices like Bragg interferometer cells. DAS and/or streamers could be directly buried without the need of a casing, as illustrated by receiver apparatus 156.

The seismic receivers may also include geophones and/or accelerometers that are planted on or near the surface, or packaged within a streamer that could either be installed within a borehole as shown in borehole 128 or buried into the ground with proper installation equipment. In another embodiment, seismic receivers 154 could be attached to the exterior of the casing of borehole 128 and/or not be attached but installed adjacent to the casing in the same borehole. In another embodiment, the seismic receiver lines lay either at the surface or they are buried perpendicular to the source lines. In other words, the seismic receivers may be buried in the ground, buried with a casing in the ground, may be attached to an inside/outside of a borehole, may be located in an open hole cemented or filled with a coupling material (e.g., cement, mud, etc.), etc.

In one embodiment, casing 117 is a plastic pipe or conduit, for example 6-inch PVC (polyvinyl chloride) pipe or other suitable material. Other casing materials include, but are not limited to, extrusions made from PE (polyethylene), HDPE (high density PE), UHMWPE (ultra-high molecular weight PE), PP (polypropylene), or polycarbonate. These materials may also include reinforcing materials in the form of fibers or filler such as carbon, aramid, glass and so on. In addition, the casing material may be an extrusion made of metal, for example, aluminum, or might be a formed or welded metal pipe (made of steel), or plastic, or of a composite material, for example, fiberglass. Casing 117 may be installed in sections, with a connector 142 that joins the sections together. Connectors 142 may be made of steel or plastic but contain a steel strip that can be used to help locate/position source 118.

In another embodiment, the connectors may contain transponders, labels such as optical or RF ID tags or other devices that can be used to detect position in a borehole. For example, source 118 may contain an inductance coil or coils that detect the presence of steel, so that when source 118 is pulled past connector 142, an electronic counter is advanced and the cumulative counts are transmitted back to the surface through umbilical 120 for estimating the source's position. In still another embodiment, tag scanners could be used instead of an inductance coil. In yet another embodiment, position location devices could be installed on the casing at locations along either the inner and/or outer wall of casing 117. Other schemes are possible.

For simplicity, only one source 118 is shown located inside borehole 116 in FIG. 1. This source may be any known seismic source. However, a more appropriate seismic source for this type of environment is discussed later with regard to FIGS. 2A-B. The source may be moved through the casing 117 for shooting at different locations as now discussed. Assume that umbilical 120 and strength member 122 and source 118 have been deployed from the pad 112 on the left of the figure. Acquisition manager controller 138 issues a command to move source 118 to position 144. The desired position location is relayed to support equipment 130 and a winch housed within support equipment 130 at the right of the figure may pull umbilical 120. In one application, at the same time, a second winch located in support equipment 130 located at the left of the figure feeds out strength member 122 until source 118 arrives at position 144. Winches and take-up reels and/or the umbilical itself may be marked and/or equipped with devices for monitoring the distance source 118 is traveling through the borehole, from an entrance/exit point. This distance information may or may not be used in conjunction with information from other position sensing devices to verify or improve the source location estimate.

Once source 118 is in position and ready to initiate a seismic emission, the information is relayed back to the acquisition management controller 138, which then transmits a start command when the acquisition system is ready to record seismic data. For the case of continuous recording systems, the sequence may be different. The seismic emission command may contain emission signal parameter information that is relayed to a sweep generator that is part of support equipment 130, which computes or generates a signal suitable to drive source 118.

At this time, source 118 emits seismic signal 123 that propagates through the surrounding medium. As signal 123 travels through various subterranean layers, part of the energy passes into the next layer and a portion maybe reflected back to the surface. Many ray paths are possible, but for simplicity, only a single ray path is shown in FIG. 1. In this case, when signal 123 impinges upon interface between layers 106 and 110, a reflection signal 124 is formed and it travels back toward the surface, where it is detected by receiver 126. In an embodiment, the received seismic signal 124 is converted by receiver 126 into an electrical signal and sent to a data recording system 170. The electrical signal is digitized and stored as file records at the data recording system 170. The data recording system 170 may be single channel or multi-channel and located near a pad 112. A file record may contain more than one received signal. The file record may include a header with a time stamp. The stored data may be integrated with data received from other receiver or the data may be combined in real time using a data transmission path/link as known in the art.

A single emission or many separate emissions may be performed by source 118 when it is at position 144. The emissions may repeat the same emission signal, for example a swept sine wave or a pseudorandom signal. The emission could also be a discrete set of frequencies, with a unique frequency used in each emission. Other combinations are possible. Typically, the emissions are designed to cover a range of frequencies, for example a range of 1 to 200 Hz. Other frequency ranges are possible. During an emission interval, either simultaneously or concurrently, measured signals from source 118, for example, a pressure, velocity, displacement, acceleration, voltage, current or temperature signal, may be relayed back to the support equipment 130 where they might be monitored or recorded or relayed back to acquisition management controller 138 through transceiver 132 and link 140.

In an embodiment, once the emissions are completed for location 144, as determined by the acquisition management controller 138 (either by following a program schedule, through analysis and verification of the received signal quality or by an operator/observer), support equipment 130 is instructed to move source 118 to a new location 146. At that time, source 118 is released from its current position and corresponding winches and other devices are activated to advance source 118 to its new position. Once at the new position 146, an emission sequence is initiated that follows the event sequence described earlier. This process is repeated until all shot locations in borehole casing 117 are complete.

The source move-up distance between adjacent shot points may be from about 1 m up to hundredes of m. These distances can be increased or decreased based on the size of the source, the requirements of the survey, etc. The overall length of borehole 116 may be about 100 m, but other lengths are possible (in the order of kilometers) and depend heavily on location, existing pad locations, and other considerations. In an embodiment, source 118 may be advanced solely by a borehole tractor device (not shown) rather than by umbilical 120 and strength member 122. In one application, the tractor may be used in addition to an umbilical to advance source 118. If multiple sources are linked together in a common borehole, then a tractor device may be needed to accurately position the devices, independently of the umbilical.

FIG. 1 also shows an electronic module 166 located on umbilical 120. Electronic module 166 may include source control equipment, for example, micro-controllers, power amplifiers, positioning systems, telemetry equipment, data acquisition equipment which may facilitate the deployment of more than one source in a common borehole and/or to record/store data from sensors 168 that are also located on umbilical 120. Sensor 168 may include seismic receivers or special monitoring devices. Electronic module 166 may share source operation and control with support equipment 130 located on or near pad 112, and umbilical 120 and/or strength member 122 (which also may be an umbilical) may contain a communication conduit for command and control commands.

In one embodiment, also illustrated in FIG. 1, a device 150 is attached to the casing's wall or, if not attached, it shares a common borehole that contains at least one seismic detector. In an embodiment, device 150 is a DAS receiver. In another embodiment, device 150 is a streamer like device 126. Device 150 may run parallel to casing 117 or it may wrap around casing 117, for example, in a spiral pattern. Device 150 may contain devices that enable it to couple to the surrounding media, either by self-embedment, collapse of the formation or facilitated through the use of pumped mud, cementation or other suitable material that can be applied when casing 117 is installed in the borehole 116. Signals sensed by device 150 are converted and/or stored in data acquisition unit 152. Data acquisition unit 152 may operate either autonomously or collaboratively with source support equipment 130. Data acquisition unit 152 may include a GPS receiver to time-stamp and/or record position information. In an embodiment, data acquisition unit 152 functions as a continuous recorder with adequate memory for data storage between data harvests. In still another embodiment, device 150 contains transponders that enable accurate positioning of source 118.

FIG. 1 depicts embodiments with seismic receivers located above and/or below borehole casing 117, for example, seismic receiver 158 located in cased borehole 160 above casing 117 or a direct burial receiver 156, not in the casing, which is above or below casing 117. However, it is possible to have surface receivers 162 in addition or instead of the buried receivers. The surface receiver includes, for example, motion detectors such as geophones and accelerometers. The surface receiver may be controlled by management system 138. Receiver 162 can be a single component device or multi-component device that is operated as a point receiver or used in conjunction with other receivers as a receiver array. Receiver 162 can function as an autonomous or semiautonomous node having a local recording device 164 that contains memory for data storage.

In still another embodiment, local recording device 164 can be configured to record data continuously and can contain a GPS receiver to enable recordings to be time stamped and or to record location information. In another embodiment, local recording device 164 includes telemetry equipment that allows for direct communication with seismic acquisition manager 138, so that data can be recorded under the command and control of manager 138.

In an embodiment, where a plurality of sources and/or a plurality of receivers are installed in the one or more casings discussed herein, the scheduling for source shot point positioning, emission times, the selection of emission signal, and/or the synchronization of multiple source emissions are coordinated through use of GPS time either in real time or the recorded GPS time is used in later processing to facilitate the separation of source contributions to the composite records. Also, the recorded signals are time stamped with the GPS time. Furthermore, in another embodiment, the GPS time is used to synchronize the emissions from the source 118 with other sources, following a pre-defined schedule for frequency or sweep table, thus automating the acquisition.

In an embodiment, the installed receivers are used for passive monitoring. For example, if continuous recording is employed, when sources are not active, the measured received signals could be processed and used to recover additional information useful in reservoir management operations. These measured seismic signals are emitted by the operation of oilfield equipment (e.g., drills, compressors, pumps, hydraulic fracturing, fluid injection and vehicles) and/or natural phenomenon (e.g., tremors, tidal action).

While the embodiments discussed above have focused on the various ways of placing the sources and moving them underground during a seismic survey, the next embodiments describe a seismic source that is more appropriate for such underground exploration than the existing seismic sources. In an embodiment, source 118 may include an electrodynamic actuator whose output can be coupled to the borehole casing as now discussed with regard to FIGS. 2A-B. Other actuator types are possible, including but not limited to, pneumatic, piezoelectric and hydraulic.

Figure 2A:
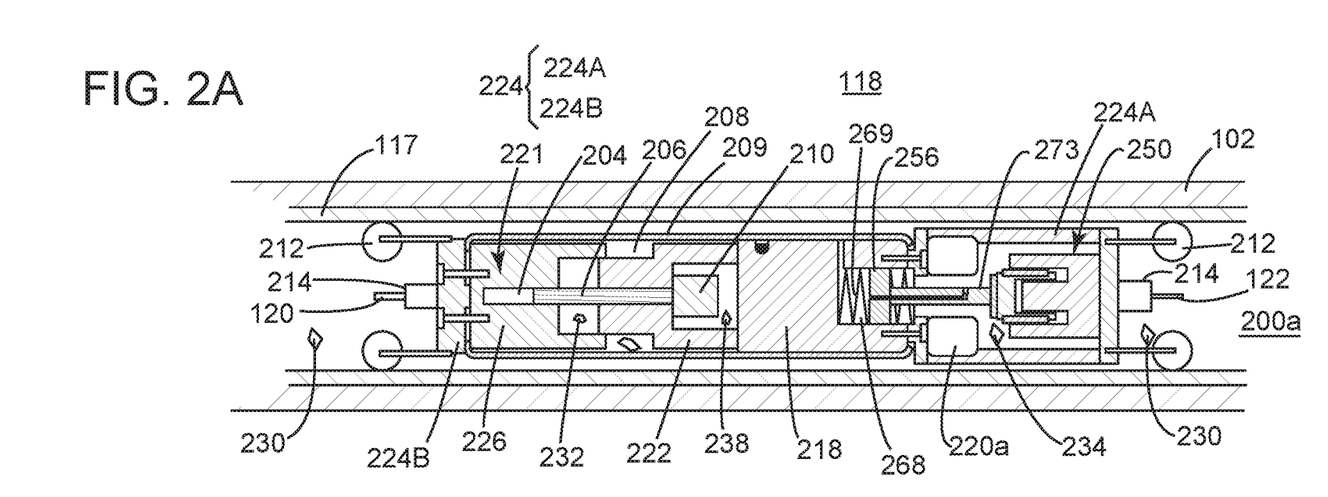
FIGS. 2A-B illustrate a seismic source for the borehole based seismic system.
Figure 2B:
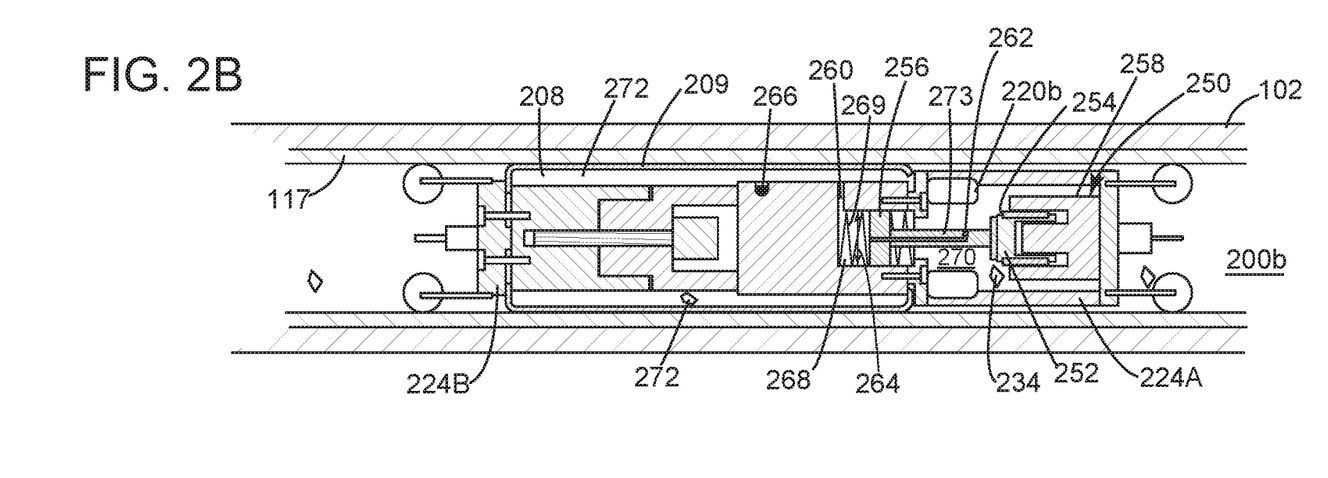

FIG. 2A shows one possible implementation of source 118. Source 118 is shown in an unclamped mode 200a in the figure, i.e., in an extended arrangement with a reduced radial profile so that it can move freely along an axial direction inside the borehole casing 117. The clamped mode 200b of source 118 is shown in FIG. 2B, with a retracted arrangement that results in an expanded radial profile to preload the source against casing 117, thereby improving the coupling of the source to the casing wall, and at the same time, to preload the surrounding medium 102 for better transmission of the signal into the medium.

Source 118 has an actuator mechanism 250 located inside a housing 224. In an embodiment as illustrated in FIGS. 2A-B, housing 224 has two separated members, 224A and 224B, and these two members are surrounded by an elastic membrane 209. Actuator mechanism 250 actuates a piston 256 for generating a varying pressure within a fluid-filled chamber 208, so that when the elastic membrane 209, which encircles chamber 208, presses directly against casing 117 as shown in FIG. 2B, acoustic energy is imparted to casing 117 and into the surrounding medium. The actuator mechanism 250 may include an armature 252 (see FIG. 2B) having coil windings 254 that ride inside field assembly 258, which includes, in this case, permanent magnets. Coil actuators typically have a lower moving mass than do moving magnet actuators, but a moving magnet actuator is also possible, particularly if the source is to be operated only at low-frequencies. Armature 252 is attached through a rod 273 to a piston 256 that rides inside bore 264 to form a hydraulic cylinder.

Centering springs 269 (see FIG. 2B) are located within bore 264 to provide a centering force to keep the piston/armature assembly centered within its normal operating region. Region 234 to the right of piston 256 and region 268 to the left of the piston 256 are filled with a corresponding fluid 270, which may be hydraulic fluid (for example mineral oil). Fluid 270 in region 268 is in fluid communication with region 208 via pathway 260. This means that when piston 256 is pushed to the left by actuator mechanism 250, the working fluid 270 is compressed in chamber 208, thus pressurizing elastic membrane 209 (the membrane material could be a rubber material, for example nitrile rubber, or it could be metal, for example, steel or beryllium copper that may contain some corrugations to enhance dimensional changes in preferred directions). Membrane 209 may contain some form of reinforcement (e.g., glass, aramid, polyester fiber and/or steel wires and/or rigid or semi-rigid structures to limit deflection in certain directions). Membrane 209 transmits the varying pressure generated by the piston 256 to chamber 208, which results in a radial force being applied to the membrane 209, that is in contact with the inner wall of casing 117, as shown in FIG. 2B. Casing 117 is in contact with the surrounding soil or near surface layer material 102 and a portion of this compression force couples to the earth and is emitted as a seismic signal.

When piston 256 moves to right, the pressure in chamber 208 drops, resulting in a drop of the dynamic radial force to create a dynamic tensile force on the earth leading to a rarefaction. The result is that for moderate frequencies, the actuator mechanism 250's force is transmitted through piston 256 to fluid 270 to membrane 209, to casing 117 and to soil 102. This force is amplified in part by the ratio (i) of the radial contact area of elastic membrane 209 and casing 117 to (ii) the piston area 256 or cylinder bore 264 area. The real force amplification that can be achieved is limited by several factors that include the trapped fluid in chamber 208, the bulk modulus of the working fluid 270, the casing stiffness and the soil stiffness.

For optimal performance, it is desired to create in the fluid 270 a static pressure that is above the pressure of any borehole fluid (e.g., fluids in regions 230 outside the source) and/or above the hydrostatic soil pressure in soil 102 at the operating depth of the source, which may be about 3-50 m. In other words, it is desired to create a preload on the inner casing walls and on the surrounding soil 102 by biasing the pressure of the working fluid 270 in chamber 208, typically 1 to 3 bars above the ambient pressure. This static pressure is desired to be generated when the source is in the clamped mode 200b. In this way, moving piston 256 superimposes a dynamic pressure fluctuation on top of the static pressure discussed above. The dynamic pressure is created, as discussed above, by the actuator mechanism 250. Actuator mechanism 250 responds to a drive signal generated by a power amplifier that is part of support equipment 130. Drive signal is transmitted to coil actuator via umbilical 122, which is connected to source 118 via connector 214.

The elevated working fluid pressure (static pressure) does not create a static load on armature 252 as the fluid 270 in chamber 208 is in fluid communication with the fluid 270 in region 234 via a small passageway 262 that runs inside the piston rod 273. Small passageway 262 may be located elsewhere, for example, it could be formed by radial clearance between piston 256 and the cylinder bore 264 and/or within cylinder body 218. Cylinder body 218 is attached to a coupling device 221 as discussed later. Passageway 262 may also contain an orifice to help further restrict the flow. Passageway 262 acts as a pressure leakage pathway providing a means for the pressure on either side of the piston to equalize over time, but tends to restrict the dynamic flow of the working fluid so that dynamic forces created by coil actuator are not compromised over the frequency range of interest, for example 1-200 Hz.

The coupling device 221 is placed inside chamber 208 and is configured to achieve a strong coupling between the source and the soil 102, by applying a static pressure on the fluid 270, so that membrane 209 is pressed against the walls of the casing 117. Coupling device 221 is attached with one end to cylinder body 218 and includes a retractable (slideable) element 226 connected to a lead screw 206, which can be turned by a driving element, for example, a motor 210. Retractable element 226 may be pulled to the right or pushed to the left by lead screw 206 when the motor 210 is actuated. Motor 210 may be a stepper motor and/or a motor equipped with a gear reduction transmission (not shown) to increase the torque that can be applied to lead screw 206. Motor 210 is located in motor housing 222. Retractable element 226 is attached to a second element 224B of the housing 224. In one embodiment, the coupling device is fully encircled by membrane 209.

To make it easier for piston 256 to move inside its bore, a gas-filled compliant chamber 220a-b, for example, a doughnut shaped nitrile rubber bladder that is gas-filled (e.g., nitrogen, a noble gas or dry air) could be used. If space is tight, a second gas-filled accumulator (not shown) could be located inside housing 224A or externally, to provide an added gas volume to make it even easier for piston 256 to move. The second gas accumulator could be connected so that it is in pneumatic communication via, for example, a hose or passageway with compliant chamber 220a-b. In another embodiment, a separate second gas-filled bladder accumulator (or it could be a bellows or diaphragm accumulator) could be located elsewhere within housing 224A. Compliant chamber 220a-b acts as a soft spring to greatly reduce the effective bulk modulus of the fluid 270 to the right side of the piston 256. When in clamped mode, the compliant gas pressure will be 1 to 3 bars above the ambient pressure. Thus, when retractable element 226 is pulled to the right by lead screw 206, which is turned, for example, clockwise, by stepper motor 210, the static pressure in chamber 208 and ultimately in chamber 234 and compliant chamber 220a-b will be elevated to be 1 to 3 bars above the ambient and membrane 209 contacts casing 117, as illustrated in FIG. 2B.

Pressure sensor 266 can provide signals to the source control electronics to act as a feedback signal either during the clamping process or during a seismic emission. Other sensors (not shown) can be mounted within or near the source to monitor temperature, pressures, acceleration, velocity or position of various components of the source.

FIG. 2A illustrates unclamped mode 200a, in which lead screw 206 has been turned counter clockwise to extend slideable element 226. As slideable element 226 is extended, chamber 232 opens up inside coupling device 221, as illustrated in FIG. 2A and working fluid 270 enters inside, which will tend to reduce the static pressure of the fluid in chamber 208, and ultimately in region 234 and the pressure of the gas in compliant chamber 220a-b. When the slideable element is fully extended away from first element 224A, as illustrated in FIG. 2A, flexible membrane 209 becomes stretched, and thus, it does not touch the walls of the casing. In this unclamped mode, the source is ready to travel. Note too that because the pressure is less, the gas volume 220a-b is greater than for the previous case as illustrated in FIG. 2A. Because an axial tension is exerted by the coupling mechanism on the reinforced elastic membrane 209, the source is decoupled from borehole casing 117 and is free to move axially. When the source is moved, centering devices 212, e.g., spring loaded wheels, help to reduce any drag between source 118 and the casing's walls. Note that the two housing elements 224A and 224B, although separated by each other, are linked to each other through cylinder body 218, motor housing 222, and retractable element 226. Because retractable element 226 moves relative to motor housing 222, a distance between housing elements 224A and 224B is adjustable.

Instead of a linear actuator, such as the coil actuator 254 and piston 256, a different scheme for creating dynamic fluctuations in the working fluid could be used. For example, actuator mechanism 250 may include a reversible variable speed electric servomotor with a rotating shaft that is connected to an impeller that rides inside bore 264. By changing the speed shaft and/or direction of shaft rotation, dynamic pressure variations could be produced. Other means of actuation include a direct hydraulic device in which a servovalve is used to directly or indirectly allow flow to enter or leave chamber 208, to create a pressure variation that is ultimately transmitted radially into the surrounding soil 102.

In another embodiment, in order to reduce any axial motion of the source due to the reaction force created by the motion of the armature and piston, two sources could be operated as a twin source, with the actuators oriented opposite to one another so that unwanted axial vibration of the two sources is cancelled. In such a twin source embodiment, the two sources could be mechanically connected or just operated in close proximity to one another.

For a good transfer of force from the source to the soil, casing 117 needs to be compliant, but at the same time, it needs to be rigid enough to withstand burial at a given depth. There are also economic considerations since as the diameter of the casing increases, installation and material costs increase. Casing material, diameter and wall thickness are thus factors to be considered. For optimal performance too, the fluid trapped in chamber 208 needs to be kept as small as possible to make the working fluid look like a stiff spring when pushing against the casing 117's walls.

Figure 3:
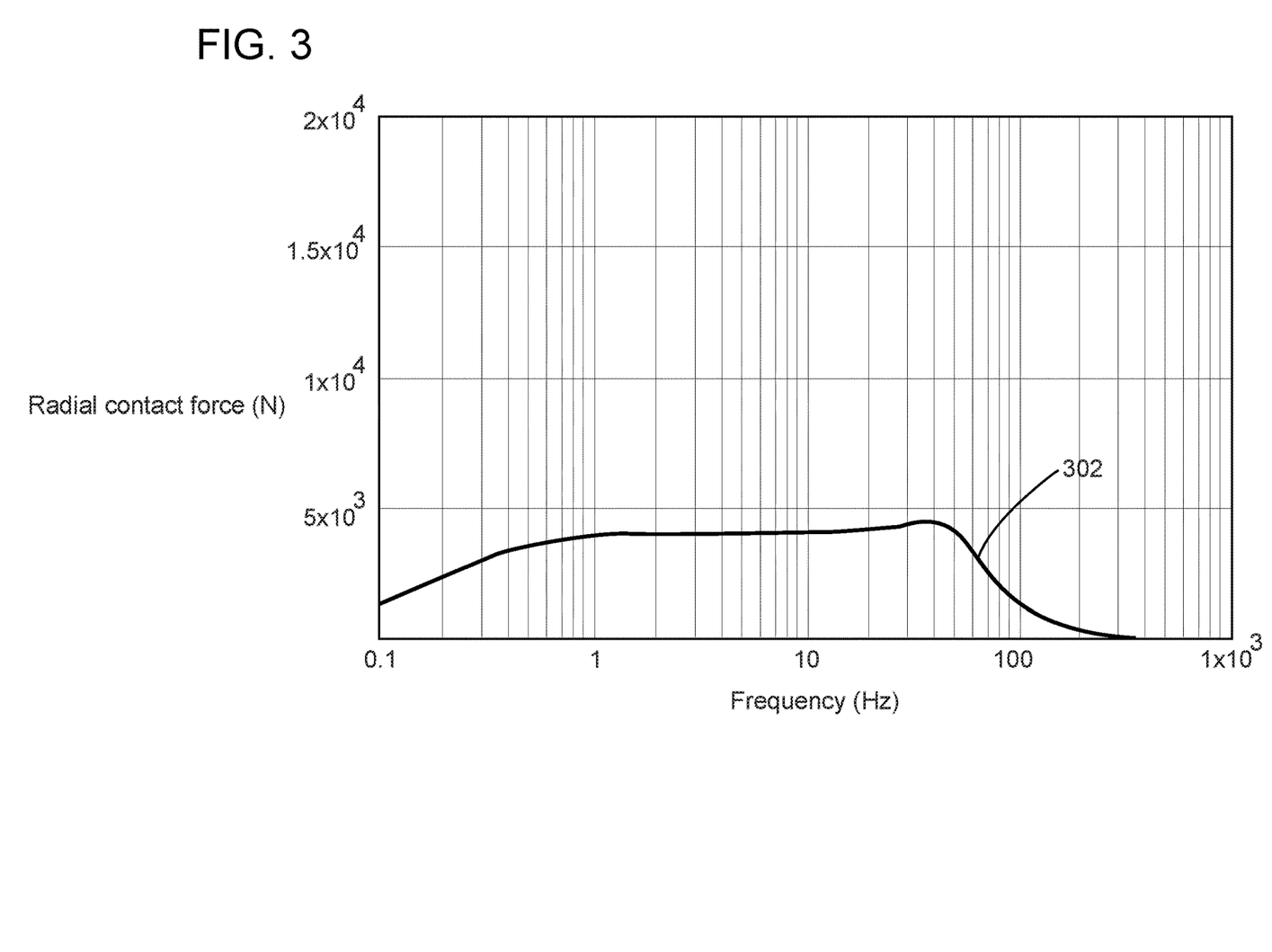
FIGS. 3-5 illustrate a radial contact force between the seismic source and a corresponding casing for various soil compositions.
Figure 4:
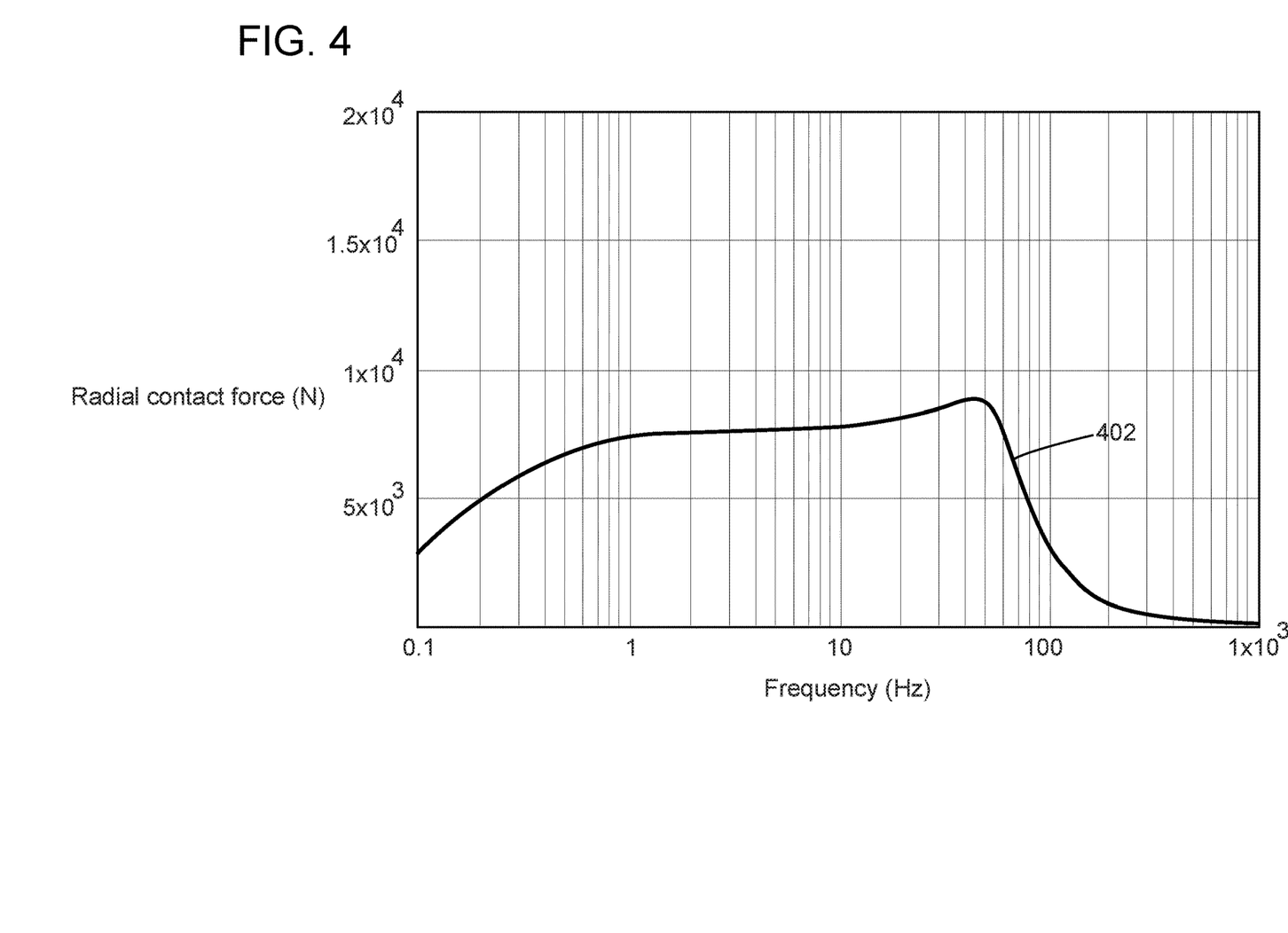
Figure 5:
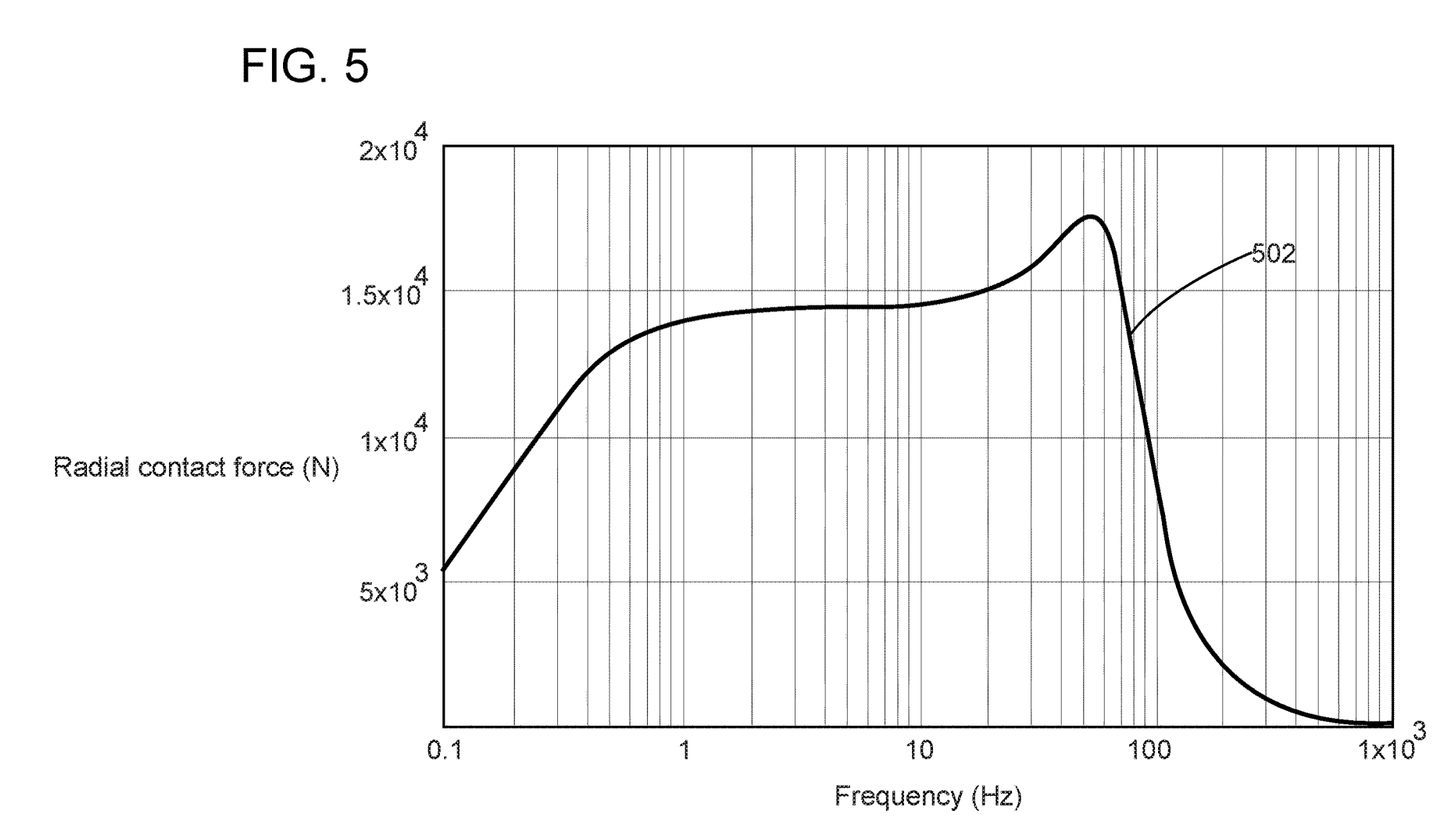

FIGS. 3, 4 and 5 show the results of source simulations conducted assuming different soil shear modulus values for the case where six-inch PVC pipe schedule 80 is used for the casing and the soil properties vary as discussed later. Soil stiffness is directly related to shear modulus and this creates in effect changes in a radial spring rate that tends to confine the expansion of casing 117. Thus, for the case of compliant soils with low shear modulus, piston 256 will have to move farther to achieve the same soil contact force than if the soil were stiff.

Curve 302 in FIG. 3 shows the overall radial contact force generated by the source when operated at different frequencies using a fixed coil current for the actuator mechanism 250 and for a soil having a shear modulus of 35 MPa. Curve 302 has a low frequency roll off due to leakage passage 262 and a damped resonance at about 40 Hz with output falling off sharply at higher frequencies. The 40 Hz resonance is determined by the overall spring rate of the source in combination with the mass of the piston-armature. Note that curve 302 shows a fairly flat response over the range of about 1 to 70 Hz, but the output force in this frequency range is about 4 kN.

Curve 402 in FIG. 4 shows what happens with a similar setup, but the soil shear modulus is now 75 MPa. It is observed that the output force is considerably greater (7 kN) and the high frequency resonance has shifted slightly and it is less damped. Curve 502 in FIG. 5 shows the response for a soil modulus of 200 MPa. The overall output force has shifted up to about 14 kN and the high frequency resonance is slightly higher and less damped. As the soil stiffness increases, the attainable force output also increases and the high frequency resonance is pushed out to higher frequencies. The shear modulus of soils generally increases under hydrostatic loading, and thus, by installing the borehole casing at a greater depth in combination with elevating the static pressure of the working fluid will create a more favorable operating environment for the source of FIGS. 2A-B.

Note that curves 302, 402 and 502 show the force output assuming a constant current input. However, the drive current could be adjusted to maintain a different force profile vs. frequency than what is shown in FIGS. 3-5, but subject to the constraints of the actuator (e.g., current, voltage and stroke). Also, curves 302, 402 and 502 assume that there is no stroke limitation on piston/armature travel. For actual sources, this will impose a low-frequency limit (not shown) on the ability to realize full output for a given current that is dependent upon the low corner frequency set by the leakage created by passageway 262 (typically the corner will fall below 1 Hz). With no leakage, the stroke required to achieve a particular force output will not increase at very low frequency.

Figure 6:
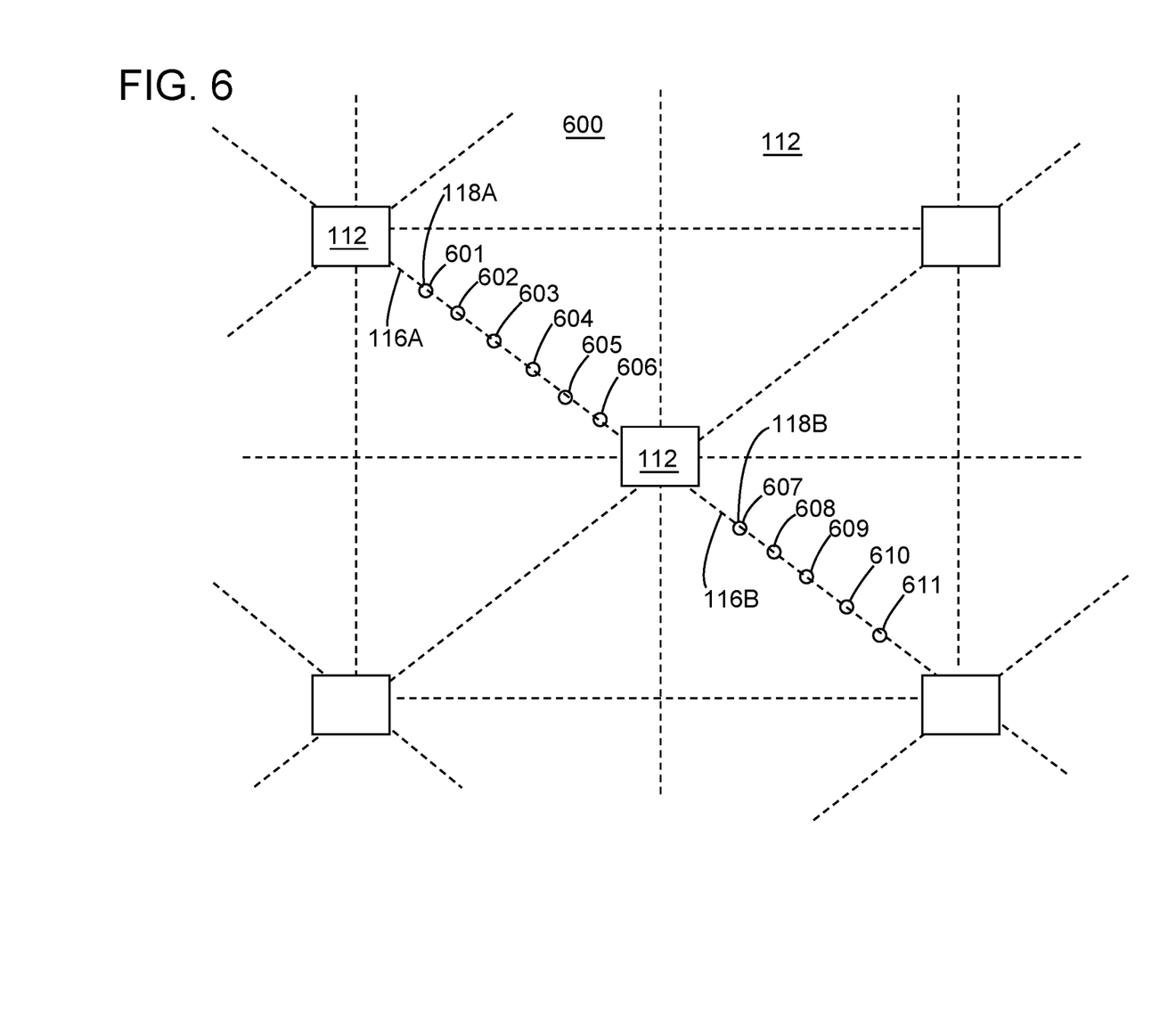
FIG. 6 illustrate a borehole based seismic system having plural seismic sources distributed in different boreholes.

In an embodiment illustrated in FIG. 6, a network 600 of cased boreholes is installed in an oilfield. FIG. 6 shows multiple pads 112 installed across the oilfield. While FIG. 6 shows the pads aligned on a grid of parallel lines, those skilled in the art would understand that the pads may be distributed in any desired arrangement on the oilfield. A source or sources could be positioned in a plurality of boreholes 116A-B and operate simultaneously. For example, a borehole source 118A could be located at shot point 601 within cased borehole 116A while at the same time, a different source 118B, is located at shot point 607 in a different borehole 116B. The two sources may be connected to a different or same umbilical. The first source could be advanced to eventually occupy positions 602 thru 606. The second source could be advanced to eventually occupy positions 607 thru 611. If discrete frequency emissions are used, the emitted frequencies could be scheduled so as not to interfere with one another, so that their contributions in a composite record can be separated during processing. Use of orthogonal signals, like pseudorandom signals or encoded swept signals, are also possible. In an embodiment, GPS time stamps can be used to coordinate the synchronization and type of emission if multiple sources are active at or about the same time. In one application, borehole 1166 is an extension of borehole 116A.

Figure 7:
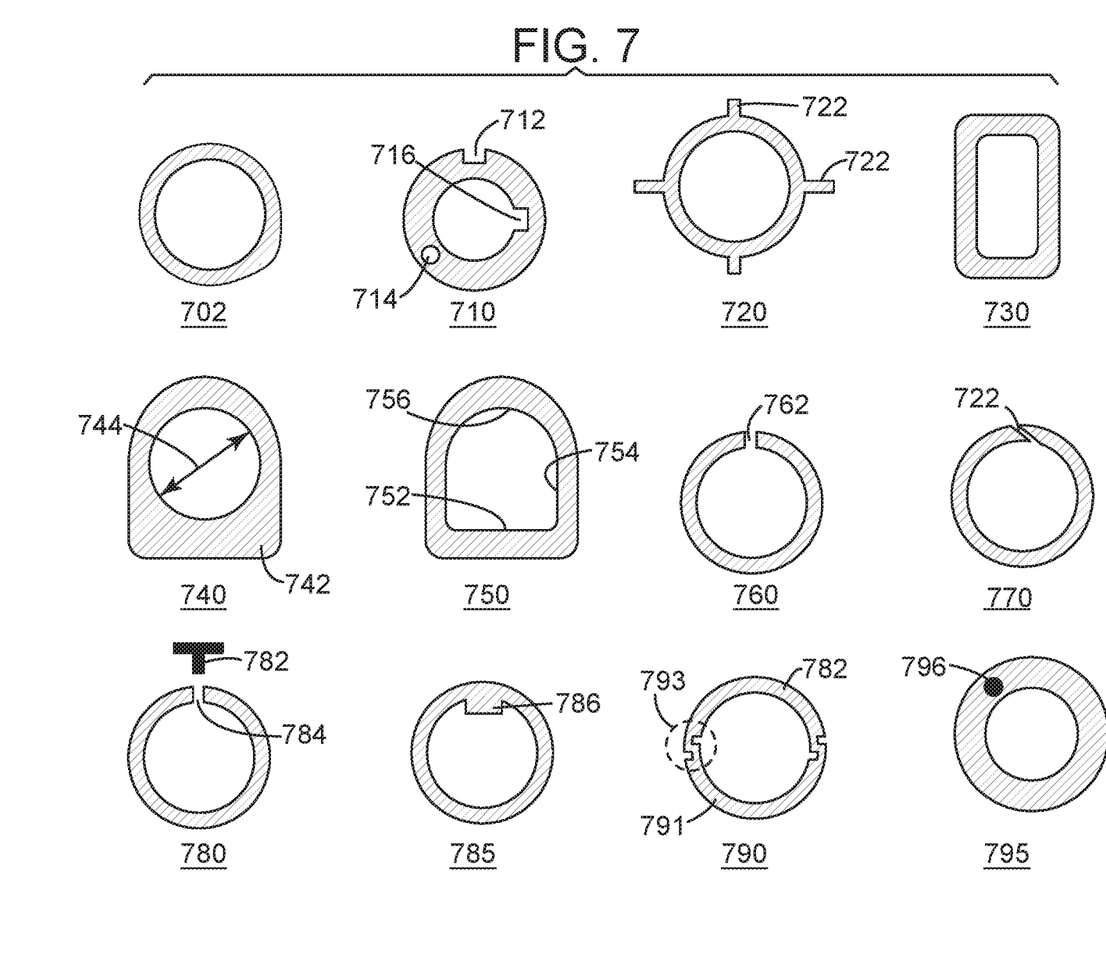
FIG. 7 illustrate various profiles for a casing of the borehole.

FIG. 7 shows a number of casing profiles for receiving the source and/or receivers discussed above. The particular features and their orientation at the top, side or bottom are for the purposes of explanation and a particular orientation is not necessarily implied in an embodiment. Profile 702 depicts a standard pipe or conduit profile with concentric or approximately concentric round bore and round exterior. Profile 710 is similar to profile 702, but includes feature 716 depicted as a slot through, which may host, for example, a receiver, positioning or communication device, both configured as a streamer or cable. Similarly a passageway 714 could be molded into the casing wall and can be used to thread/accommodate a communication, receiver and/or positioning device. Feature 712 is similar to feature 716, but it is formed outside the casing. Profile 720 shows a casing profile with exterior features 722 formed as an aid to improve coupling to surrounding medium. Feature 722 can run longitudinally or in a spiral around the casing exterior. Other patterns are possible. Casing profile 730 depicts a casing with a rectangular (or square) shape to provide features useful for orienting receivers that are sensitive to direction inside a casing. Profile 740 has a round interior 744 and one exterior flat side 742. This feature can be used in the installation process to help limit rotation of the casing as it is installed or to help orient the casing so that it will bend in a preferred direction. Profile 750 is similar in exterior to profile 740 and has some of the same benefits, but has different interior features, e.g., a flat bottom 752, at least one flat side 754, and a round top 756. These internal features may enhance the installation procedure with the further benefit of allowing for devices contained with the casing to be oriented or to better permit the use of devices like tractors to help pull an umbilical. Profile 760 includes feature 762, an opening to the interior to facilitate installation of cables or other devices into the conduit or casing. For example, after a streamer has been placed inside feature 762, the casing could be filled in with a resin to provide a sealed conduit. In an alternative embodiment, profile 770 depicts feature 762 which has functional benefits similar to 760, but in this case feature 772 is better suited for resealing the pipe. For example, for this profile, there is no need for a resin, as an ultrasonic welding machine could be used to reseal the casing (if made of plastic) after the streamer was placed inside. Another option is profile 780 that has a slot 784 but in this case a plug 782 is used to seal the casing. Profile 785 illustrates interior feature 786 that can be used as a key to orient a sensor or source within the borehole or could be useful as a track for a tractor. Profile 790 is comprised of lower half 791 and upper half 792 with interlock feature 793. Profile 790 provides easy access to the interior of the casing at the time of installation. Feature 793 can be something similar to a snap lock, or if a good seal is required, as for feature 770, and if a plastic casing is used, then the two halves could be ultrasonically welded or glued together. If a metal casing is used, then welding or brazing could be used to join the pieces together. Profile 795 shows the casing with device 796 molded in its wall. Device 796 could be a DAS receiver or it could be a cable used to assisting with source positioning.

Figure 8:
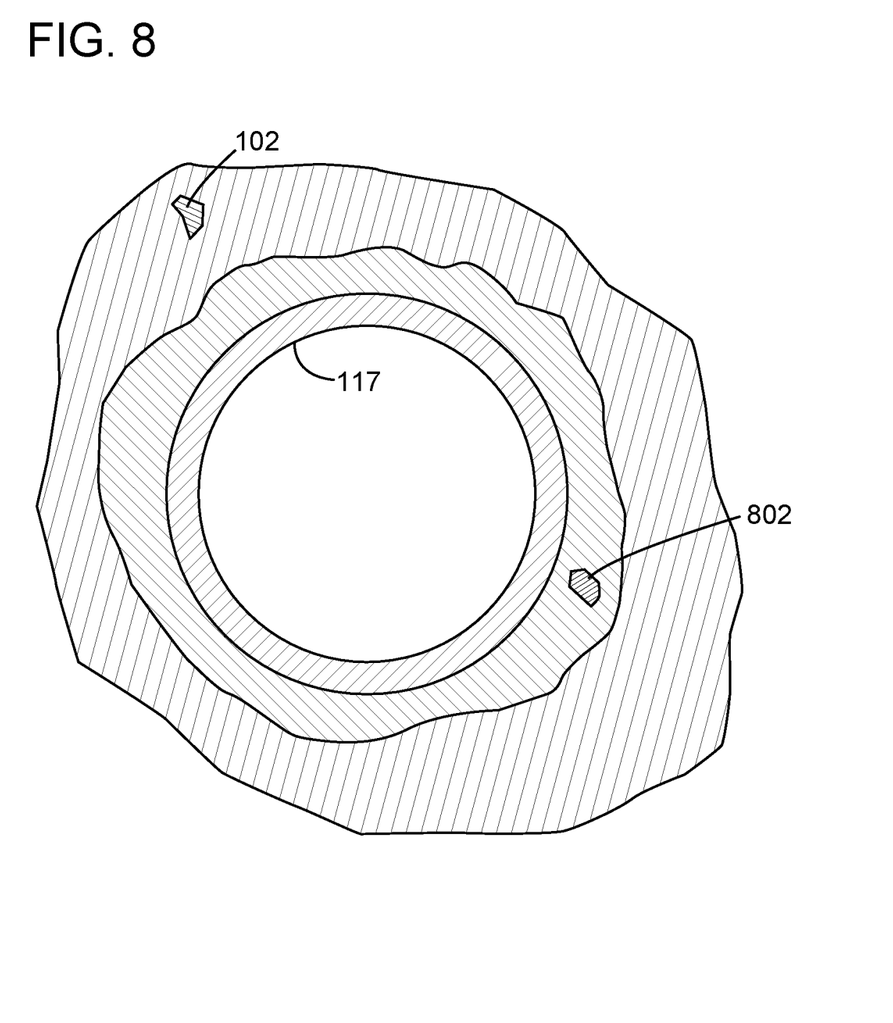
FIG. 8 illustrates a coupling material poured between the casing and the soil.

FIG. 8 illustrates an embodiment in which casing 117 is installed in subsurface medium 102 with a coupling material 802 pumped in the borehole to surround casing 117. For the situation where the near surface contains consolidated material and not soil, then casing 117 may need to be cemented in place to ensure good coupling. The above considerations are applicable not only to source casing 117, as illustrated in FIG. 8, but also to receiver casing 128 and/or casing 160 discussed above with regard to FIG. 1.

The particular composition of coupling material 802 will be location dependent. For instance, coupling material 802 may be a material containing, for example, Portland cement that becomes hard after curing. In other cases, the coupling material may be something that will just swell and fill up the cavity and/or a mud, clay or material containing bentonite that expands when wet. This is so because one function of the coupling medium is to reduce the likelihood of any voids between the casing wall and surrounding formation. In many instances, reliance on formation's collapse to fill the gap is not sufficient. Ideally, the coupling material should have a stiffness that matches that of the formation, or otherwise signal emission will be attenuated either due to "confinement" by a too stiff coupling material or by an attenuation that creates unwanted expansion of the casing wall and limits the amount of pressure the source can generate.

In another embodiment, grouting the casing (e.g., using Techstem) may be possible using perforated casing, keeping a continuous flow of liquid grout (pumped to and fro) through the casing and allowing leakage to do the grouting, followed by washing out the inside of the casing. This would improve the soil stiffness around the casing and fill any voids produced during drilling.

Although, the above embodiments have focused on time-lapse seismic surveys, the same equipment can be used to conduct other seismic surveys. In an embodiment, source 118 can be deployed in a vertical borehole for use in conducting a reverse vertical seismic profile (RVSP). In another embodiment, source 118 and receivers could be positioned within different boreholes that may be horizontal, or both vertical and/or of mixed orientations to acquire data for a cross-borehole tomography survey and/or for a vertical seismic profile (VSP) and/or HSP surveys. Other geometries are possible, for example, some or all sources and/or receivers in inclined/dipping. In another embodiment, sources are operated below ground with receivers located on the surface. The various orientations may be useful for improving emission patterns that are not available in standard VSP data surveys.

Figure 9:
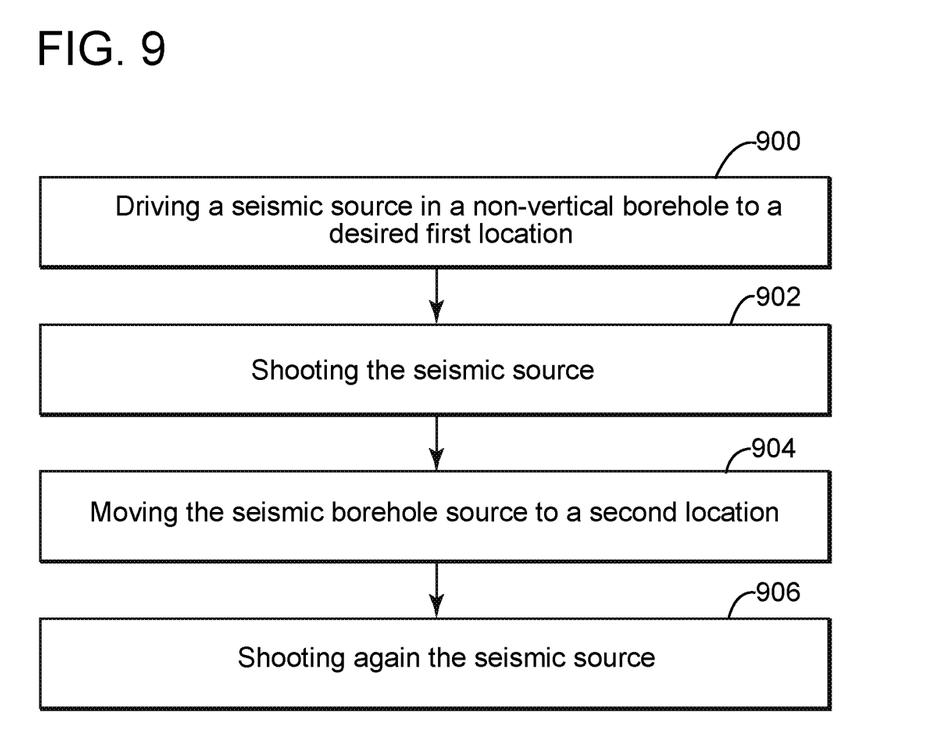
FIG. 9 is a flowchart of a method according to an embodiment.

According to an embodiment illustrated in FIG. 9, there is a method for generating seismic waves in a borehole. The method includes a step 900 of driving a seismic source in a non-vertical borehole to a desired first location, a step 902 of shooting the seismic source, a step 904 of moving the seismic source, for example, with one umbilical and one strength member (or two umbilicals) attached to opposite ends of the seismic source and to two different surface location or a tractor, to a second location, and a step 906 of shooting again the seismic source. Those skilled in the art would know that the seismic source may be moved in other ways inside the borehole, for example, with two tractors, one tractor and one umbilical, one umbilical and a weight, etc.

The disclosed exemplary embodiments provide methods and systems that generate seismic waves in non-vertical boreholes. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic source for generating seismic waves in a non-vertical borehole, the seismic source comprising:
   a housing;
   an actuator mechanism located inside the housing and configured to generate a fluctuating pressure;
   a flexible membrane attached to surround the housing and configured to hold a fluid; and
   a coupling device covered by the flexible membrane and configured to generate a static pressure on the flexible membrane,
   wherein, when moving inside the non-vertical borehole, the seismic source has an extended arrangement with a reduced radial profile, the flexible membrane not being in contact with the walls of the non-vertical borehole and, when generating acoustic signals, has a retracted arrangement with an expanded radial profile, the flexible membrane being in contact with the walls of the non-vertical borehole.

2. The seismic source of claim 1, further comprising:
   a piston driven by the actuator mechanism.

3. The seismic source of claim 2, wherein a back and forth movement of the piston generates the fluctuating pressure.

4. The seismic source of claim 1, wherein the housing comprises:
   a first element accommodating the actuator mechanism and located at one end of the source; and
   a second element located at the other end of the source,
   a distance between the first and second elements is changeable by the coupling device.

5. The seismic source of claim 4, wherein the flexible membrane is stretched between the first and second elements.

6. The seismic source of claim 4, further comprising:
   a body connected to the first element of the housing and being sandwiched between the coupling mechanism and the actuator mechanism.

7. The seismic source of claim 6, wherein a first end of the membrane is attached between the first element of the housing and the body and a second end of the membrane is attached between the coupling mechanism and the second element of the housing.

8. The seismic source of claim 4, further comprising:
   an umbilical cable attached to the second element; and
   a strength member attached to the first element.

9. The seismic source of claim 4, further comprising:
   centering devices attached to the first and second elements and configured to center the source inside the casing.

10. The seismic source of claim 1, wherein the coupling device includes:
    a driving element; and
    a retractable element that is attached to a rod so that when the driving element is actuated, the retractable element moves back and forth along an axial direction of the housing.

11. The seismic source of claim 10, wherein the retractable element is farthest from the motor when the source travels through the casing so that the flexible membrane does not touch the casing, and the retractable element is closest to the driving element when in a shooting position so that the flexible membrane touches the casing.

12. The seismic source of claim 1, further comprising:
a piston driven by the actuator mechanism,
wherein a chamber in which the actuator mechanism is located fluidly communicates with a chamber in which the coupling device is located.

13. The seismic source of claim 12, further comprising:
a compliant device that is in fluid communication with the chamber in which the actuator mechanism is located.

14. The seismic source of claim 1, wherein the coupling device is configured to change a length of the housing along an axial direction of the source.

* * * * *